US006891735B2

(12) United States Patent
Hultermans et al.

(10) Patent No.: US 6,891,735 B2
(45) Date of Patent: May 10, 2005

(54) EMI SHIELDED ADAPTER FOR FIBER OPTIC CONNECTOR SYSTEMS

(75) Inventors: Antonius Hultermans, Tilburg (NL); Jacob Arie Elenbaas, Heyningen (NL); Jeffrey Dean Shipe, Camp Hill, PA (US); Eric James Hopkins, Newport, PA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 10/320,249

(22) Filed: Dec. 16, 2002

(65) Prior Publication Data

US 2003/0147230 A1 Aug. 7, 2003

Related U.S. Application Data

(60) Provisional application No. 60/341,556, filed on Dec. 14, 2001.

(51) Int. Cl.$^7$ .................................................. H05K 7/00
(52) U.S. Cl. ...................... 361/800; 361/753; 439/564; 439/573; 385/55
(58) Field of Search ................................ 361/752, 753, 361/758, 796, 799, 800; 439/607, 939, 638, 544, 564, 596, 573; 385/55, 56, 58, 59, 60, 88

(56) References Cited

U.S. PATENT DOCUMENTS 4,618,196 A * 10/1986 Muzslay ..................... 439/492
5,233,674 A * 8/1993 Vladic ......................... 385/56
5,689,609 A 11/1997 Tonejc
5,886,294 A 3/1999 Scrimpshire et al. ..... 174/35 R
5,937,121 A * 8/1999 Ott et al. ..................... 385/59
6,193,420 B1 2/2001 Sikorski, Jr.
6,200,041 B1 3/2001 Galo
6,305,961 B1 10/2001 Szilagy et al. ............. 439/271
6,431,764 B1 * 8/2002 Scharf et al. ................ 385/88
6,474,876 B1 * 11/2002 Sikorski, Jr. ................ 385/55
6,572,272 B2 * 6/2003 Ngo ........................... 385/53
2002/0012503 A1 1/2002 Kuhne

FOREIGN PATENT DOCUMENTS

JP 11-023908 1/1999
WO 00/46623 8/2000

* cited by examiner

Primary Examiner—David Martin
Assistant Examiner—Thanh S. Phan

(57) ABSTRACT

An adapter using an electrically-conductive wall within the adapter to channel EMI emissions to ground. In a preferred embodiment, the adapter comprises: (a) an elongated housing having a first and second end and defining a first passageway extending axially from the first end toward the second end, and a second passageway extending axially from the second end toward the first end, each passageway configured to receive an optical connector plug; (b) an electrically-conductive wall traversing the adapter between the first and second passageways, the wall being sized to cover a substantial portion of the opening when the adapter is mounted to the chassis; and (c) at least one portion of the wall extending outside of the housing to electrically couple with the chassis of the computer system when the adapter is mounted to the chassis forming an electrically-conductive path between a point on the wall and the chassis.

21 Claims, 2 Drawing Sheets

EMI SHIELDED ADAPTER FOR FIBER OPTIC CONNECTOR SYSTEMS

REFERENCE TO RELATED APPLICATION

This applications claims priority to U.S. Provisional Application 60/341,556, filed Dec. 14, 2001, which is hereby incorporated by reference.

FIELD OF THE INVENTION

The present invention relates generally to adapters for the use with fiber optics, and, more specifically, to an adapter having electromagnetic interference (EMI) shielding.

BACKGROUND OF THE INVENTION

In the optical fiber field, there is a need to connect the optical transmission path of a fiber or device to that of another fiber or device. Often this connection is effected by inserting a plug into an adapter. As used herein, the term "adapter" refers to any structure that facilitates fiber/fiber, device/fiber and device/device interconnections. An adapter generally comprises a housing, or portion of a housing, having a port which is configured to receive and hold a plug to facilitate the plug's optical connection with another plug or other device which connected to the adapter. The plug typically comprises a plug housing and a ferrule or other means for holding and precisely positioning one or more fiber ends. When the plug is inserted in the adapter, the adapter and plug are "mated." Likewise, when the plug is not inserted in the adapter, the adapter and plug are "unmated." Specific types of adapters include, for example, connector couplings which facilitate the connection of two plugs. Such couplings may have various configurations (e.g., simplex, duplex and quad) for use in various applications (e.g., backplane and through-chassis interconnections). Another important type of adapter includes those that are attached to or integral with a device to facilitate the optical connection between the device and a plug. Typical devices include, for example, active devices, such as transceivers and transmitters, and passive devices, such as attenuators and multiplexers/demultiplexers.

Often adapters are used to facilitate the connection of an optical connector plug to another connector plug or device contained within a chassis. The term "chassis" as used herein broadly refers to a containment structure for housing electrical components or switching components. The connector assembly is typically mounted in a chassis or housing through an opening which is slightly larger than the housing of the adapter. The adapter is attached to the chassis using fasteners which extend through mounting holes in the tabs which extend from either side of the adapter. Although effective in securing an adapter to a chassis, this mounting configuration may be susceptible to EMI leakage.

Reducing EMI emissions is becoming more important as operating frequencies increase. Although EMI does not affect optical components, other electronic equipment used in conjunction with optical components may be sensitive to EMI noise or may generate EMI noise. Accordingly, it is preferable that the chassis be designed to prevent passage of EMI radiation. Unfortunately, adapter openings in the chassis are sources of EMI leakage. For example, the MU adapter requires an opening of approximately ⅝" by ⅜". Furthermore, a chassis will typically have a series of openings to accommodate a multitude of adapters thus compounding the EMI leakage problem.

One common prior art approach for providing EMI shielding around adapters is to cover the connector assembly with an electrically-conductive shroud or boot. Although this provides reduced EMI leakage, it requires space within the chassis to accommodate the EMI boot. This is problematic since space within the chassis is usually limited. Furthermore, as the complexity of equipment increases to accommodate more fibers, space within the chassis will become even more precious.

Thus, there is a need to provide EMI shielding for adapters without consuming a significant amount of space. The present invention fulfills this need among others.

SUMMARY OF THE INVENTION

The present invention provides for unobtrusive EMI shielding for an adapter by using an electrically-conductive wall within the adapter to channel EMI emissions to ground. In a preferred embodiment, the adapter comprises: (a) an elongated housing having a first and second end and defining a first passageway extending axially from the first end toward the second end, and a second passageway extending axially from the second end toward the first end, each passageway configured to receive an optical connector plug; (b) an electrically-conductive wall traversing the adapter between the first and second passageways, the wall being sized to cover a substantial portion of the opening when the adapter is mounted to the chassis; and (c) at least one portion of the wall extending outside of the housing to electrically couple with the chassis of the computer system when the adapter is mounted to the chassis forming an electrically-conductive path between a point on the wall and the chassis. Preferably, this portion extends around the entire perimeter of the adapter resulting in a continuous or nearly continuous ring of contact when the adapter is mounted to the chassis. Having an electrical coupling around the perimeter increases the EMI shielding performance of the adapter by reducing areas of possible leakage and ensures the shortest possible path to ground from any point on the electrically-conductive wall.

The adapter in accordance with the present invention provides several advantages over the prior art. First, it reduces EMI leakage in and out of the shielded chassis through the hole where the adapter is mounted. This is accomplished without the need for a space consuming EMI boot inside the chassis. Additionally, it forms an electrical coupling with the chassis along a substantial portion of the perimeter of its surface that contacts the chassis faceplate. This minimizes the grounding path length for any point on the electrically-conductive wall, thereby reducing the potential for the electrically-conductive wall to radiate EMI. Aside from offering improved EMI performance, the adapter of the present invention reduces assembly time and expense by eliminating the need to install an EMI boot over the installed adapter. The adapter of the present invention is installed using the same procedure and tools as a conventional adapter. Thus, the adapter of the present invention offers the benefits of a conventional adapter plus improved EMI shielding.

DETAILED DESCRIPTION OF THE INVENTION

Figure 1:
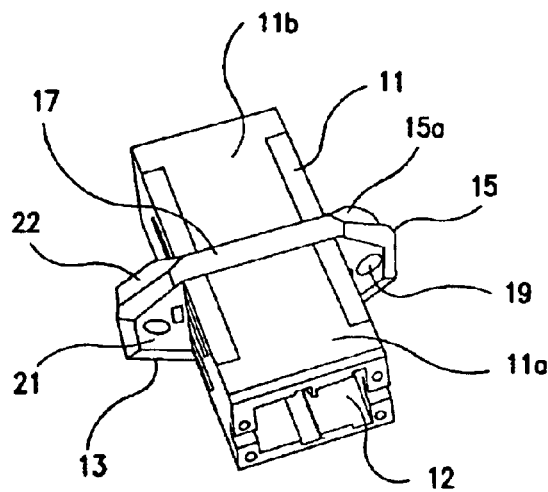
FIG. 1 illustrates the electrically-conductive EMI wall or shield in accordance with the present invention.

The present invention provides for an adapter (as defined above) which comprises internal EMI shielding to reduce the EMI emissions passing in or out of a chassis on which the adapter is mounted. The adapter of the present invention is described herein with respect to the MU duplex adapter. It should be understood, however, that the present invention may be practiced with adapters of any known or later-developed connector systems, including, for example, the MPO connector system, Lightray MPX® connector system (Tyco Electronics Corporation, Harrisburg, Pa.), LC connector system, SC connector system, FC connector system, and MT-RJ connector system. The present invention is discussed below using an MU connector system as the preferred embodiment. It should be understood, however, that the invention is not limited to this connector type and is applicable to all connector systems utilizing an adapter portion. Furthermore, it should be understood, that the adapter of the present invention is not restricted to facilitating plug to plug connections, but may be used to facilitate the interconnection of different devices or plugs and devices as discussed above with respect to the definition of adapter.

Referring to FIGS. 1–4, a preferred embodiment of an adapter of the present invention is shown which is suitable for receiving MU-type connector plugs and for mounting in an opening of a chassis of a computer system (not shown). The adapter comprises an elongated housing 11 having a first and second end 11a, 11b. The housing defines a first passageway 12a extending axially from the first end 11a toward the second end 11b, and a second passageway 12b extending axially from the second end 12b toward the first end 11a. Each passageway is configured to receive an optical connector plug which in this particular embodiment is an MU connector plug. The adapter also comprises an electrically-conductive wall 23 traversing the housing 11 between the first and the second passageways. The electrically-conductive wall 23 is sized to cover a substantial portion of the opening when the adapter is mounted to the chassis. At least one portion (e.g., 13, 17) of the wall extends beyond the housing to electrically couple with the chassis of the computer system when the adapter is mounted to the chassis thereby forming an electrically-conductive path between a point 26 on the wall and the chassis. The various elements of the adapter of the present invention are described in detail below.

Figure 4:
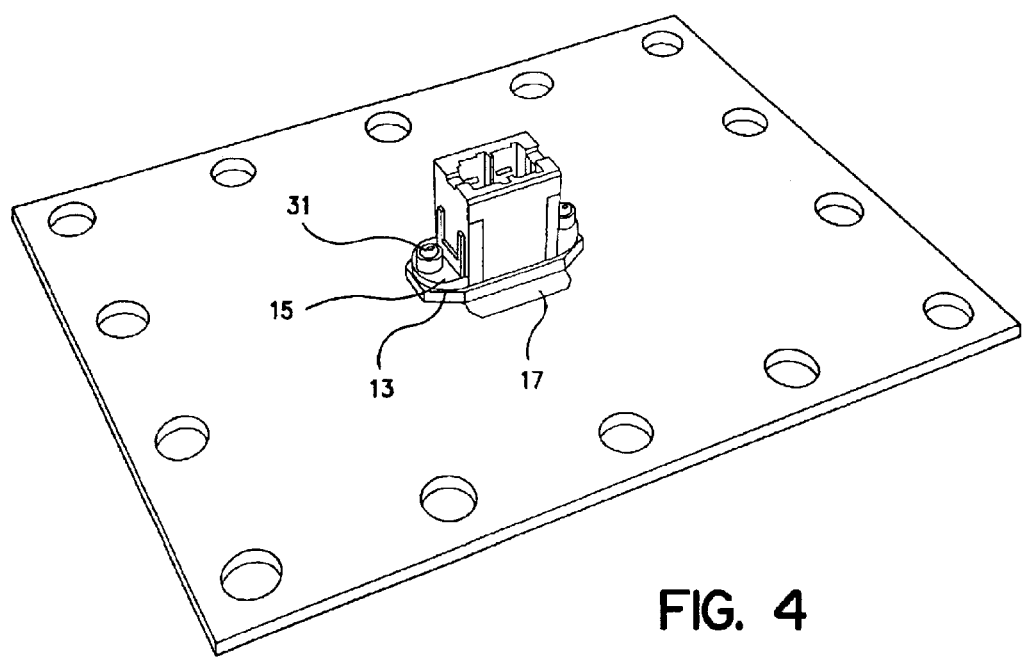
FIG. 4 illustrates an adapter in accordance with the present invention shown installed on a faceplate.

As shown in FIGS. 1 and 4, the adapter housing 11 is a rectilinear structure. This particular adapter serves to secure connector plugs in place such that the ferrules contained within the connector plugs are properly aligned, both axially and radially as is well known in the art. The adapter also serves to secure the connector assembly to the chassis. FIG. 4 illustrates an adapter that has been mounted to a faceplate.

To facilitate securing the adapter to the chassis, the adapter comprises mounting members 15 on two sides. A mounting hole 19 is located on each mounting member. The chassis faceplate typically has an opening which is large enough for the rectangular housing 11 of the adapter to be inserted into, but not large enough for the mounting members to pass through so that the mounting members contact the faceplate during installation. The opening size, therefore, depends upon the particular type of adapter. For example, a typical opening size for an MU or MPO adapter is about ⅜"×⅝". Once inserted in the opening, the adapter is then secured in place using a fastener (e.g., screw, rivet) 31 which extends through the mounting holes 19 and corresponding holes (not shown) in the faceplate.

When the adapter is mounted, one side of the mounting member is in contact with the chassis or faceplate. This side is referred to herein as the contacting face 21, while the reverse side is the non-contacting face 22.

Although only one adapter is shown mounted to the faceplate in FIG. 4, it should be understood that in typical applications many adapters may be mounted to the faceplate. Furthermore, the opening in the faceplate may be larger than that for an MU adapter since other connector systems require larger adapters. As is well known, each opening in a chassis faceplate is a potential leak for EMI emissions. As the number and size of these openings increases, the potential for EMI emissions increases.

To minimize EMI leaks through these openings, the adapter of the present invention employs an electrically-conductive shield to channel EMI emissions to ground. It is well known in the art that when an electromagnetic field passes over a grounded conductive member, a current is induced in the conductive member and the electromagnetic field is reduced. By creating an electrically-conductive shield across as much of the adapter opening as possible, EMI leakage can be minimized.

Figure 2:
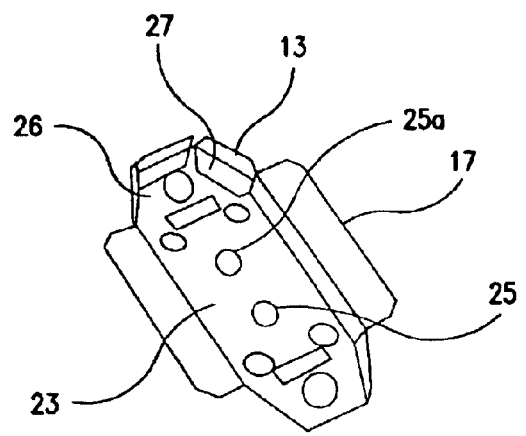
FIG. 2 shows an adapter with the EMI wall incorporated internally into the adapter center in accordance with the present invention.

To this end, the adapter of the present invention contains an electrically-conductive layer. Referring to FIG. 2, the electrically-conductive layer in the preferred embodiment is a wall 23 formed from an electrically-conductive metal material. FIG. 2 illustrates the electrically-conductive wall before it is incorporated into the adapter.

Figure 3:
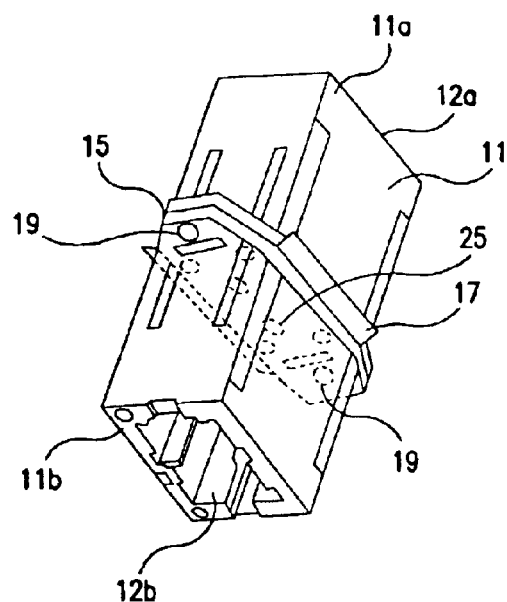
FIG. 3 is another view of an adapter in accordance with the present invention showing the location of the EMI shielding layer.

The wall is located in the adapter to be approximately in the same plane as the chassis faceplate when the adapter is mounted to the faceplate. In the MU embodiment of the adapter, this position corresponds to about the midpoint between the first and second ends of the adapter. The electrically-conductive wall extends laterally across the adapter housing 11, as shown in FIG. 3. and is perpendicularly aligned with the connector receiving passageways 12. The positioning of the electrically-conductive wall 23 within the adapter housing is such that when the adapter is mounted, the electrically-conductive wall 23 will extend across the opening in the chassis.

Although the electrically-conductive wall 23 preferably spans the opening in the faceplate, some openings are necessary to accommodate the waveguide and perhaps the alignment features of the plug connector. For example, as illustrated in FIG. 2, openings 25 and 25a are formed through the wall 23, each opening receives a ferrule containing a fiber.

Aside from openings in the electrically-conductive wall 23 to accommodate the waveguide, other openings may be required in the electrically-conductive wall 23 to accommodate the alignment features. For example, MT-type connector systems (e.g., MPO connectors, Lightray MPX® connectors) use alignment pins to and pin-receiving holes to effect precise alignment between ferrules or between a ferrule and a device.

It is preferable that the number and size of the openings in the electrically-conductive wall be kept to a minimum since increasing the size and the amount of openings in the wall will reduce the EMI shielding characteristics of the adapter. The amount of open area in the electrically-conductive wall will vary depending upon the type of connector used and whether it has alignment features that need to be accommodated. Preferably, the adapter is configured to accommodate small form factor connectors, such as the MU, MPO, LC and Lightray MPX® connector systems, since they have relatively small ferrules compared to older connector systems such as the SC and FC-type connectors. More preferably, the connector system is a single-fiber ferrule type, such as the MU or LC connector systems, since single fiber, small form factors require the smallest openings in the electrically-conductive wall.

When the adapter is mounted to the chassis of the faceplate, preferably at least 70% of the faceplate opening is blocked by the electrically-conductive wall, more preferably at least 80% of the opening is blocked, and even more preferably at least 90% of the opening is blocked.

The electrically-conductive wall 23 can be formed using a variety of materials. Several factors contribute to the choice of material including high conductively, ease of manufacture, resiliency, and corrosion-resistance.

It is well known that in order to conduct the EMI to ground, the electrically-conductive wall must be a highly electrically-conductive material such as a metal or a polymeric embedded with metals. The electrically-conductive property of the electrically-conductive wall 23 may result in galvanic corrosion if not matched properly with the material of the chassis faceplate. Galvanic corrosion occurs when two dissimilar metals make electrical contact in the presence of an electrolyte, which can be moisture. In order to minimize galvanic corrosion, the material used to form the electrically-conductive wall 23 should have properties closely matching the electrically-conductive surface to which it will be mounted.

Another factor to be considered in choosing the material for the electrically-conductive wall is the resilient properties of the material chosen. For ease of manufacture, the electrically-conductive wall layer can be formed using a die cutting process. After the wall is die cut from a flat sheet, it needs to be formed into the adapter housing, which may require bending it around the mounting members 15 of the adapter (as described below), and it may have integral conducting members extending from it beyond the housing to make electric contact with the chassis when the adapter is mounted. Thus, an ideal material will be pliable enough to stamp and form and have enough resiliency to maintain its shape once formed but be able to deflect to accommodate tolerances in the adapter and between the adapter and the chassis faceplate.

The electrically-conductive wall 23 in the preferred embodiment is formed using a phosphorous bronze alloy. This material provides adequate conductivity and corrosion properties, while at the same time, is easily configured using a stamping process.

To provide the desired EMI shielding, the electrically-conductive wall must be electrically coupled to the chassis when the adapter is mounted thereon. To this end, at least a portion of the electrically-conductive wall 23 extends beyond the interior of the housing of the adapter to contact the chassis faceplate and form an electrically-conductive coupling with it. In a preferred embodiment, the electrically-conductive wall comprises tabs 27 that extend from its edges. The tabs 27 are dimensioned to extend past the non-contacting side 27 of the mounting member, and to wrap around the edge 15a of the mounting member 15 such that a distal portion 13 covers at least a portion of the contacting surface 21. In this manner, the electrically-conductive wall 23 extends over the front of the contacting surface 21 so that when the adapter is mounted to the chassis, electrical contact will be made between the distal portion 13 of the tab 27 and the chassis faceplate. As illustrated in FIG. 4, electrical contact between the tabs and the chassis can be achieved by the pressure created between the contacting surface 21 and the chassis caused when a fastener 31 is employed to mount the adapter to the chassis faceplate. This method will provide effective electrical coupling between the chassis and the electrically-conductive wall, providing that the surface to which the adapter is mounted is smooth. If the chassis surface is not smooth or additional EMI protection is desired, additional EMI gasketing techniques may be used, including, for example, the use of electrically-conductive pliable gaskets, electrically-conductive adhesive, or electrically-conductive tape.

In addition to the tabs 27, the electrically-conductive wall also preferably comprises flanges 17 which extend outward on the sides of the adapter to create additional surface area for contacting the chassis. The two flanges 17 extend outward perpendicular to the adapter passageways 12 and run the entire length of the two longer sides of the rectangular adapter housing. When the adapter is mounted to the chassis, flanges 17 contact the chassis when the adapter is mounted and thus increase the surface contact area. Preferably, the flanges 17 are resilient and are formed such that they angle slightly in the direction of the contacting face 21. This way, when the flanges 17 are pressed against the chassis during mounting, they deflect resiliently and ensure physical contact the chassis as illustrated in FIG. 4. This, in turn, insures electrical coupling between the electrically-conductive wall and the chassis and thereby reduces the possibility of EMI noise leakage through the termination interface.

The combination of the tabs 27 and the resilient flanges 17 forms an electrically-conductive coupling around a substantial portion of the perimeter of the adapter which is in contact with the chassis. Having an electrically-conductive coupling around the perimeter increases the EMI shielding performance of the adapter by reducing areas of possible leakage and ensures the shortest possible path to ground from any point on the electrically-conductive wall 23. This is critical as the operating frequencies of the components inside the chassis increase. These components generate higher frequency EMI which can pass through even small openings or gaps. Much of the telecommunications equipment used today have components that operate at over 1 GHz and generate EMI at those frequencies and their higher order harmonics. Thus, in order to achieve the highest possible levels of EMI shielding protection at these higher frequencies, the adapter of the present invention is configured to form an electrical coupling with the chassis along a substantial portion of the perimeter of its surface that contacts the chassis faceplate. Preferably, the substantial portion is 80% of the perimeter, more preferably, the substantial portion is 90% of the perimeter. This minimizes the length of the grounding path for any point on the electrically-conductive surface, thereby reducing the potential for the electrically-conductive wall to radiate EMI. As used herein, the term "grounding path length" refers to the shortest distance between a point on the electrically-conductive wall to a point along the perimeter of the adapter which conductively couples with the chassis when the adapter is installed. In a preferred embodiment, the grounding path length for any point on the electrically-conductive wall is no greater than the shortest cross-section dimension of the portion of the adapter which is inserted through the chassis opening (herein "short dimension"). For example, if the portion of adapter which is interested in the chassis opening has cross section dimensions of ⅜"×⅝" (i.e., its short dimension is ⅜"), then the grounding path length for any point on the electrically-conductive wall would be no greater than ⅜". More preferably, the grounding path length for any point on the electrically-conductive wall is no greater than half of the short dimension. In the example above, this translates to a grounding path length of no greater than 3/16".

It should be understood that the foregoing is illustrative and not limiting and that obvious modifications may be made by those skilled in the art without departing from the spirit of the invention. Accordingly, the specification is intended to cover such alternatives, modifications, and equivalence as may be included within the spirit and scope of the invention as defined in the following claims.

What is claimed is:

1. An adapter for receiving optical connector plugs and being suitable for mounting through an opening in a chassis of a computer system, said adapter comprising:
   an elongated housing having a first and second end and defining a first passageway extending axially from said first end toward said second end, and a second passageway extending axially from said second end toward said first end, each passageway configured to receive an optical connector plug;
   an electrically-conductive wall traversing said adapter between said first and said second passageways, said wall being sized to cover a substantial portion of said opening when said adapter is mounted to said chassis; and
   at least one portion of said wall extending outside of said housing to electrically couple with the chassis of said computer system when said adapter is mounted to said chassis forming an electrically-conductive path between a point on said wall and said chassis, said portion extending around the perimeter of said adapter resulting in a substantially continuous periphery of contact between said portion and said chassis when said housing is mounted in said opening of said chassis, said wall comprising at least one resilient flange extending outwardly beyond the rest of said adapter such that it is not encumbered from bending toward said first and second ends, said resilient tab adapted to urge against said chassis when said housing is mounted in said opening of said chassis.

2. An adapter as set forth in claim 1, wherein said adapter has one or more mounting flanges extending laterally outside of said housing to facilitate mounting said adapter to said chassis.

3. An adapter as set forth in claim 1, wherein each mounting flange has a contacting face which abuts said chassis when said adapter is mounted to said chassis and a non-contacting face opposite said contact face, said wall being disposed along said non-contact face of said mounting flange.

4. An adapter as set forth in claim 3, wherein said portion of said wall comprises tabs which wrap around said mounting flanges to provide a contact point on said contacting face to electrically couple with said chassis when said adapter is mounted to said chassis.

5. An adapter as set forth in claim 1, wherein said wall comprises at least one orifice for allowing the passage of a ferrule of a connector.

6. An adapter as set forth in claim 5, wherein said wall comprises at least one other orifice for allowing the passage of an alignment pin of said connector.

7. An adapter as set forth in claim 5, wherein said ferrule is for an MU connector.

8. An adapter as set forth in claim 5, wherein said ferrule is for an LC connector.

9. An adapter as set forth in claim 5, wherein said ferrule is for an MPO connector.

10. An adapter as set forth in claim 5, wherein said ferrule is for an SC connector.

11. An adapter as set forth in claim 5, wherein said ferrule is for an FC connector.

12. An adapter as set forth in claim 5, wherein said wall is sized to cover at least about 75% of the opening.

13. An adapter as set forth in claim 5, wherein said wall is sized to cover at least about 95% of the opening.

14. An adapter as set forth in claim 1, wherein said electrically-conductive wall comprises a metal.

15. An adapter as set forth in claim 1, wherein the grounding path length for any point on said electrically-conductive wall is no greater than the small dimension of said adapter.

16. An adapter as set forth in claim 15, wherein said housing has a rectangular cross section having two longer sides and two shorter sides, said grounding path having a length no greater than half the length of a shorter side.

17. An adapter as set forth in claim 1, wherein said housing has a rectangular cross section having two longer sides and two shorter sides, and wherein a resilient flange runs along the length of each of said two longer sides of said housing.

18. An adapter as set forth in claim 17, wherein said adapter has one or more mounting flanges extending outwardly from the shorter sides of said housing to facilitate mounting said adapter to said chassis, each mounting flange having a contacting face which abuts said chassis when said adapter is mounted to said chassis and a non-contacting face opposite said contact face.

19. An adapter as set forth in claim 18, wherein said resilient flanges are formed such that they angle slightly in the direction of the contacting face such that said resilient flanges urge against said chassis when said adapter is mounted to said chassis.

20. An adapter as set forth in claim 19, wherein said wall is disposed along said non-contacting face of said mounting flanges.

21. An adapter as set forth in claim 20, wherein said portion of said wall comprises tabs which wrap around said mounting flanges to provide a contact point on said contacting face to electrically couple with said chassis when said adapter is mounted to said chassis.

* * * * *